(12) United States Patent
Benz et al.

(10) Patent No.: US 7,584,599 B2
(45) Date of Patent: Sep. 8, 2009

(54) METHOD FOR OPERATING A GAS TURBINE AS WELL AS A GAS TURBINE FOR IMPLEMENTING THE METHOD

(75) Inventors: Eribert Benz, Birmenstorf (CH); Manfred Wirsum, Baden-Daettwil (CH)

(73) Assignee: ALSTOM Technology Ltd., Baden (CH)

( * ) Notice: Subject to any disclaimer, the term of this patent is extended or adjusted under 35 U.S.C. 154(b) by 513 days.

(21) Appl. No.: 11/275,479

(22) Filed: Jan. 9, 2006

(65) Prior Publication Data

US 2007/0033943 A1 Feb. 15, 2007

Related U.S. Application Data

(60) Provisional application No. 60/706,776, filed on Aug. 10, 2005.

(51) Int. Cl.
*F02C 1/06* (2006.01)
(52) U.S. Cl. ............... 60/39.17; 60/39.12; 60/774; 60/781
(58) Field of Classification Search ............ 60/781, 60/774, 39.12, 39.17
See application file for complete search history.

(56) References Cited

U.S. PATENT DOCUMENTS

| | | | |
|---|---|---|---|
| 1,589,704 | A | 6/1926 | Kenworthy |
| 4,261,167 | A | 4/1981 | Paull et al. |
| 4,488,398 | A | 12/1984 | Noguchi |
| 4,785,621 | A | 11/1988 | Alderson et al. |

(Continued)

FOREIGN PATENT DOCUMENTS

DE 947843 8/1956

(Continued)

OTHER PUBLICATIONS

Mukherjee, D., "State-of-the-art gas turbines—a brief update," ABB Review 1997:4-14;vol. 2; ABB Asea Brown Boveri Ltd., Zurich, Switzerland.

(Continued)

*Primary Examiner*—Michael Cuff
*Assistant Examiner*—Phutthiwat Wongwian
(74) *Attorney, Agent, or Firm*—Cermak Kenealy Vaidya & Nakajima LLP; Adam J. Cermak

(57) ABSTRACT

In a method for operating a gas turbine (11) in a combined cycle power plant (40), air, which is used to burn a syngas that is recovered from coal, is drawn in and compressed by the gas turbine (11), the compressed air is fed into a combustor (18, 19) and such that a portion of the compressed air is separated into oxygen and nitrogen. An improved degree of efficiency is achieved by this method by virtue of the fact that a gas turbine (11) with reheating and two combustors (18, 19) and two turbines (16, 17) is used. In the first combustor (18), syngas is burned using the compressed air, and the resultant hot gases are expanded in the first turbine (16). In the second combustor, syngas is burned using the gases coming from the first turbine (16) and the resultant gases are expanded in the second turbine (17) such that the nitrogen that occurs in the separation of the air is led to the gas turbine (11) to be compressed.

7 Claims, 4 Drawing Sheets

U.S. PATENT DOCUMENTS

| | | | |
|---|---|---|---|
| 4,785,622 A | | 11/1988 | Plumley et al. |
| 4,896,499 A | * | 1/1990 | Rice .......................... 60/792 |
| 4,986,499 A | | 1/1991 | Ponticelli |
| 5,081,845 A | * | 1/1992 | Allam et al. ................. 62/646 |
| 5,459,994 A | * | 10/1995 | Drnevich ..................... 60/783 |
| 5,577,378 A | | 11/1996 | Althaus et al. |
| 6,116,016 A | | 9/2000 | Wada et al. |
| 6,487,863 B1 | | 12/2002 | Chen et al. |
| 6,513,317 B2 | | 2/2003 | Arar et al. |
| 2002/0077512 A1 | * | 6/2002 | Tendick et al. .............. 568/959 |
| 2002/0148213 A1 | | 10/2002 | Yu |
| 2004/0168468 A1 | | 9/2004 | Peyron |
| 2007/0033918 A1 | | 2/2007 | Benz et al. |
| 2007/0033942 A1 | | 2/2007 | Benz et al. |
| 2007/0039468 A1 | | 2/2007 | Benz et al. |

FOREIGN PATENT DOCUMENTS

| | | |
|---|---|---|
| DE | 2503193 | 7/1976 |
| EP | 0622535 | 4/1994 |
| EP | 0634562 | 7/1994 |
| EP | 0773416 | 5/1997 |
| EP | 0795685 | 9/1997 |
| EP | 1098077 | 5/2001 |
| GB | 2335953 | 10/1999 |
| JP | 08218891 | 8/1996 |
| JP | 11030131 | 2/1999 |

OTHER PUBLICATIONS

Search Report for Swiss Patent App. No. CH 20222005 (Apr. 5, 2005).

International Search Report for PCT Patent App. No. PCT/EP2006/065105 (Nov. 13, 2006).

Pending Claims from U.S. Appl. No. 11/275,477 as of Oct. 30, 2008, pp. 1-4.

Pending Claims from U.S. Appl. No. 11/275,478 as of Oct. 30, 2008, pp. 1-3.

Pending Claims from U.S. Appl. No. 11/275,480 as of Oct. 30, 2008, pp. 1-3.

Non-Final Office Action issued in U.S. Appl. No. 11/275,477 (Oct. 16, 2008).

Non-Final Office Action issued in U.S. Appl. No. 11/275,478 (Oct. 17, 2008).

Non-Final Office Action issued in U.S. Appl. No. 11/275, 480 (May 13, 2008).

* cited by examiner

METHOD FOR OPERATING A GAS TURBINE AS WELL AS A GAS TURBINE FOR IMPLEMENTING THE METHOD

This application claims priority under 35 U.S.C. §119 to U.S. provisional application No. 60/706,776, filed 10 Aug. 2005, the entirety of which is incorporated by reference herein.

BACKGROUND OF THE INVENTION

1. Field of the Invention

The present invention relates to the field of power plant technology. It pertains to a method for operating a (stationary) gas turbine as well as to a gas turbine for implementing the method.

2. Brief Description of the Related Art

A gas turbine with reheating (reheat gas turbine) is known (see, for example, the U.S. Pat. No. 5,577,378 or "State-of-the-art gas turbines—a brief update," ABB Review February 1997, FIG. 15, turbine type GT26), which combines flexible operation with very low flue gas emission values.

The machinery architecture of the gas turbine of Type GT26 is unique and is exceptionally well-suited to realizing a concept that is the subject matter of the present invention, because:

even in the case of the compressor, there is a significant diversion of compressor air at intermediate compressor pressures, the concept of sequential combustion renders an increased stability of combustion possible in conjunction with reduced levels of excess oxygen, and a secondary air system is present, which renders it possible to divert air from the compressor, to cool it down, and to use the cooled air for cooling the combustor and the turbine.

The principle of the known gas turbine with reheating is shown in FIG. 1. The gas turbine 11, which is a portion of a combined cycle power plant 10, includes two connected compressors, arranged behind one another on a commonly shared shaft 15, namely a low pressure compressor 13 and a high pressure compressor 14, as well as two combustors, namely a high pressure combustor 18 and a reheat combustor 19, and the pertinent turbines, namely a high pressure turbine 16 and a low pressure turbine 17. The shaft 15 drives a generator 12.

The manner in which the unit works is as follows: air is drawn in from the low pressure compressor 13 via an air inlet 20, and is compressed initially to a level of intermediate pressure (ca. 20 bar). The high pressure compressor 14 then further compresses the air to a level of high pressure (ca.32 bar). Cooling air is diverted at both the level of intermediate pressure and at the level of high pressure and cooled down in pertinent OTC coolers (OTC=Once Through Cooler) 23 and 24 and conducted further to the combusters 18 and 19 and turbines 16, 17 for cooling purposes. The remaining air from the high pressure compressor 14 is led to the high pressure combustor 18, and heated there by the combustion of a fuel introduced by fuel feedline 21. The resultant flue gas is then expanded in the downstream high pressure turbine 16 to an intermediate level of pressure as it performs work. After expansion, the flue gas is heated again in the reheat combustor 19 by the combustion of a fuel introduced by fuel feedline 22 before it is expanded in the downstream low pressure turbine 17, performing additional work in the process.

The cooling air, which flows through the cooling lines 25, 26, is sprayed in at suitable points of the combustors 18, 19 and turbines 16, 17 to limit the material temperatures to a reasonable degree. The flue gas coming out of the low pressure turbine 17 is sent through a heat recovery steam generator 27 (HRSG) to generate steam, which flows through a steam turbine 29 within a water-steam circuit, and performs additional work there. After flowing through the heat recovery steam generator 27, the flue gas is finally given off to the outside through a flue gas line 28. The OTC coolers 23, 24 are part of the water-steam circuit; superheated steam is generated at their outlets.

Due to the two combustions in the combustors 18 and 19, which are independent of each other and follow each other in sequence, great operational flexibility is achieved; the temperatures in the combustors can be adjusted in such a way that the maximum degree of efficiency is achieved within the existing limits. The low flue gas levels of the sequential combustion system are the result of the inherently low emission levels that can be achieved in the case of reheating (under certain conditions, the second combustion even leads to a consumption of NOx).

On the other hand, combined cycle power plants with single stage combustion in the gas turbines are known (see, for example, U.S. Pat. No. 4,785,622 or U.S. Pat. No. 6,513,317 B2), in which a coal gasification unit is integrated in order to provide the requisite fuel for the gas turbine in the form of syngas, which is recovered from coal. Such combined cycle power plants are designated IGCC (Integrated Gasification Combined Cycle) plants.

The present invention now proceeds from the recognition that due to the use of gas turbines with reheating in an IGCC plant, the advantages of this type of gas turbine can be made usable for the plant in a particular manner.

SUMMARY OF THE INVENTION

One aspect of the present invention includes a method for the operation of a gas turbine, especially one that works in concert with a coal gasifier, which is characterized by an improved degree of efficiency, which also exhibits, in particular, the advantages of intermediate cooling, as well as to create a gas turbine for implementing the method.

It is particularly advantageous that a gas turbine with reheating be used in a gas turbine unit that works with syngas from a coal gasifier, which comprises two combustors and two turbines, in which, in the first combustor, syngas is burned using the compressed air, and the resultant hot gases are expanded in the first turbine, and in which syngas is burned in the second combustor, using the gases that come from the first turbine, and the resultant hot gases are expanded in the second turbine and the nitrogen that occurs in the separation of the air is led to the gas turbine to be compressed again. Due to the addition of the comparatively cold nitrogen to the compressor, the compressor air is cooled, and the result is a kind of compressor intermediate cooling that is associated with all the advantages of such intermediate cooling. In addition to the advantages with respect to the thermodynamic degree of efficiency, the temperature in the compressor is reduced, which leads to a reduction of the quantity of cooling air that is required, or renders the additional cooling of the cooling air unnecessary.

One embodiment of the method according to the invention is characterized in that the gas turbine comprises an first compressor for the compression of drawn in air to an first pressure stage and a second compressor for the further compression of the air from the first pressure stage to a second, higher pressure stage, that a portion of the air coming from the first compressor is separated into oxygen and nitrogen and that the nitrogen that occurs in the course of this separation is led to the second compressor to be compressed.

In the process, the nitrogen preferably undergoes pre-compression in another compressor before it is led to the second compressor.

The pre-compressed nitrogen can, in the process, be led to the inlet of the second compressor, in particular.

Another embodiment of the method according to the invention is characterized in that the gas turbine exhibits an first compressor for the compression of drawn in air to an first pressure stage and a second compressor for the further compression of the air from the first pressure stage to a second, higher pressure stage, that a portion of the air coming out of the first compressor is separated into oxygen and nitrogen, and that the nitrogen that occurs in the course of this separation is led to the first compressor to be compressed.

In the process, the nitrogen can be conducted to the first compressor at an intermediate stage. Alternatively, however, it can also be conducted to the inlet of the first compressor.

An embodiment of the gas turbine according to the invention is characterized in that two compressors, one connected behind the other, are provided, that the nitrogen line is led back to the second compressor, and that an additional compressor is provided in the nitrogen line.

In particular, the nitrogen line can be led back to the inlet of the second compressor.

Another embodiment is characterized in that two compressors, one connected behind the other, are provided and that the nitrogen line is led back to the first compressor, either to the inlet of the first compressor or to an intermediate stage of the first compressor.

Preferably, the air separation unit exhibits an oxygen line on the same side of its outlet for the purpose of giving off the oxygen that occurs in the course of the separation, which is led to a unit for the purpose of generating syngas by means of coal gasification in which a syngas feed line transports the syngas that is generated from the syngas generation unit to the combustors.

BRIEF DESCRIPTION OF THE DRAWINGS

In what follows, the invention is to be illustrated in greater detail by virtue of the embodiment examples in conjunction with the drawing.

DETAILED DESCRIPTION OF EXEMPLARY EMBODIMENTS

Figure 1:
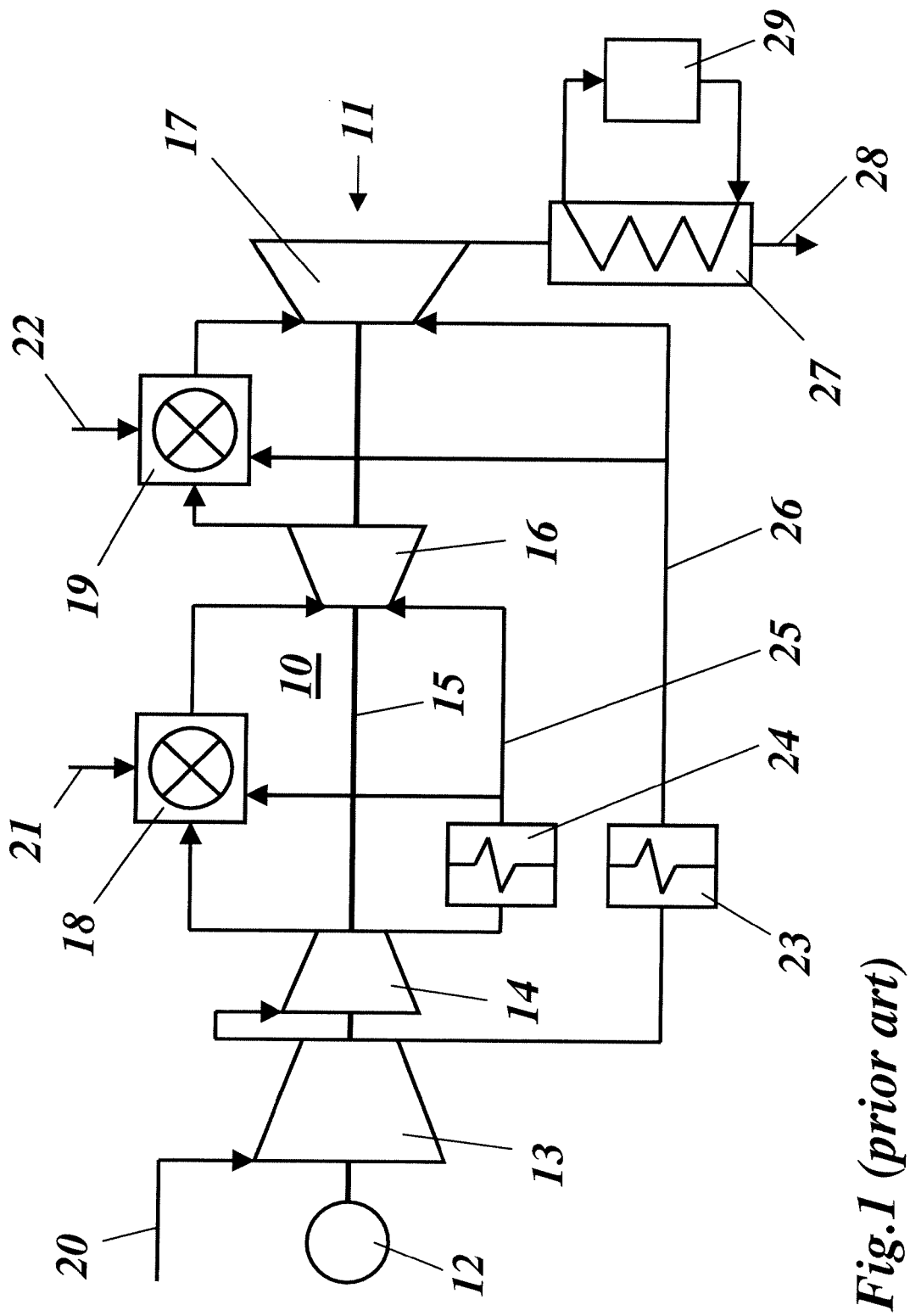
FIG. 1 shows the simplified schematic of a combined cycle power plant with a gas turbine with reheating or sequential combustion in accordance with the prior art.
Figure 2:
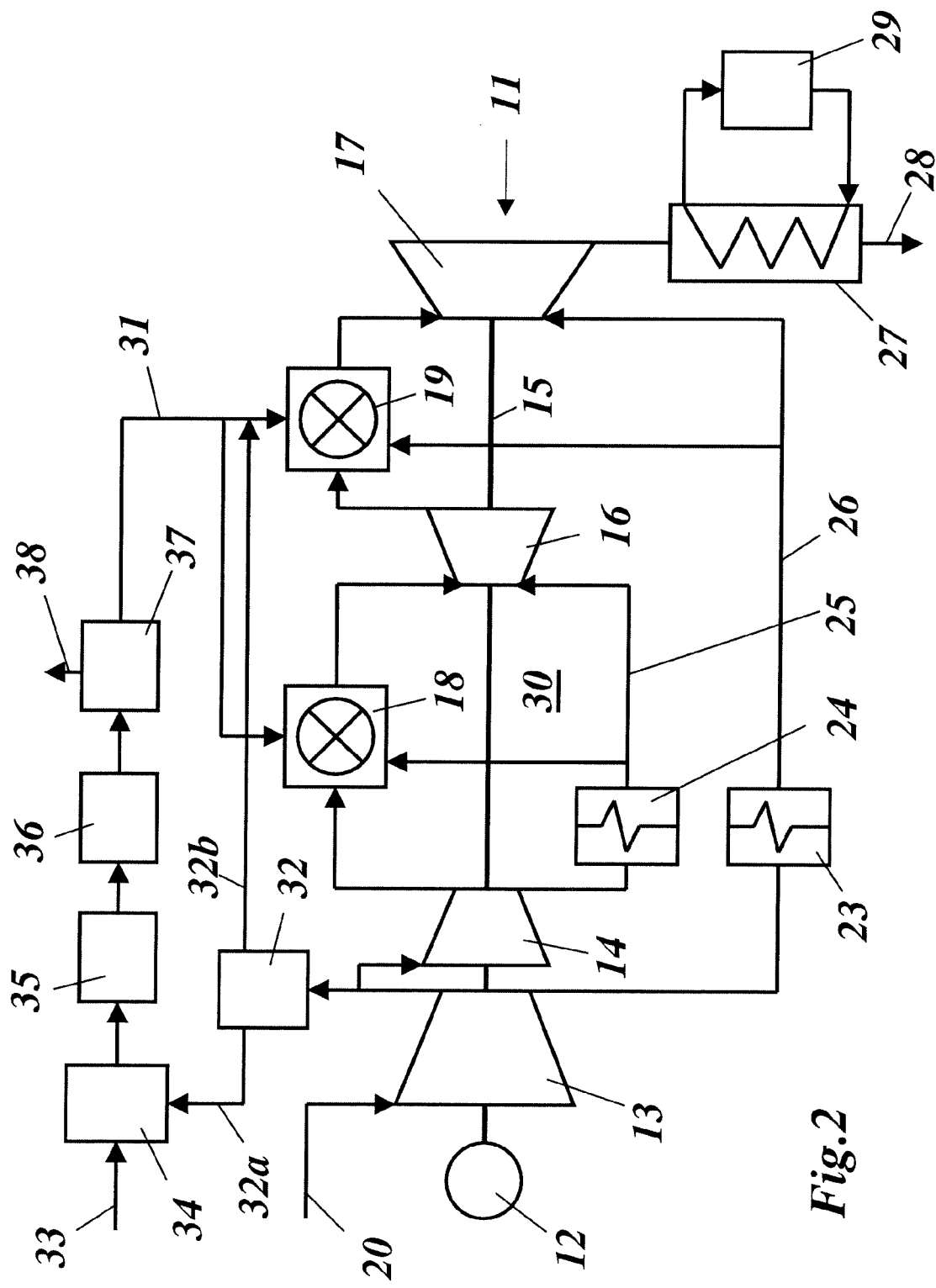
FIG. 2 shows the simplified schematic of an IGCC plant with a gas turbine with reheating or sequential combustion, respectively, as it lends itself to the realization of the invention.

In FIG. 2 in a markedly simplified schematic, an IGCC plant with a gas turbine with reheating or sequential combustion, respectively, is shown as it lends itself to the realization of the invention. The combined cycle power plant 30 comprises a gas turbine 11 with a low pressure compressor 13, a downstream high pressure compressor 14, a high pressure combustor 18 with a downstream high pressure turbine 16 and a reheat combustor 19 with a downstream low pressure turbine 17. The compressors 13, 14 and the turbines 16, 17 sit on a commonly shared shaft 15, by means of which a generator 12 is driven. Via feedline 31, the combustors 18 and 19 are supplied with syngas as fuel, which is generated by the gasification of coal (coal feeding 33) in a coal gasifier 34. The coal gasifier 34 is topped by a cooling device 35 for the syngas, a filtering device 36 and a $CO_2$ separator 37 with a $CO_2$ outlet 38 for giving off the separated $CO_2$.

Oxygen (O2), which is recovered in an air separation unit 32, and introduced via an oxygen line 32a, is used to gasify the coal in the coal gasifier 34. The air separation unit 32 receives compressed air from the outlet of the low pressure compressor 13. The nitrogen ($N_2$), which also occurs in the separation, is led, for example, to the low pressure combustor 19 via nitrogen line 32b.

To cool the components of the combustors 18, 19 and turbines 16, 17 that have been exposed to hot gas, compressed cooling air is tapped off at the outlets of the two compressors 13 and 14, cooled off in a topped OTC cooler 23 or 24 and then led to the points to be cooled via the corresponding cooling lines 25 and 26.

At the outlet of the low pressure turbine 17, a heat recovery steam generator 27 is provided, which, together with a steam turbine 29 that is connected, is part of a water-steam circuit. The flue gas that emerges from the heat recovery steam generator 27 is released to the outside via a flue gas line 28.

Figure 3:
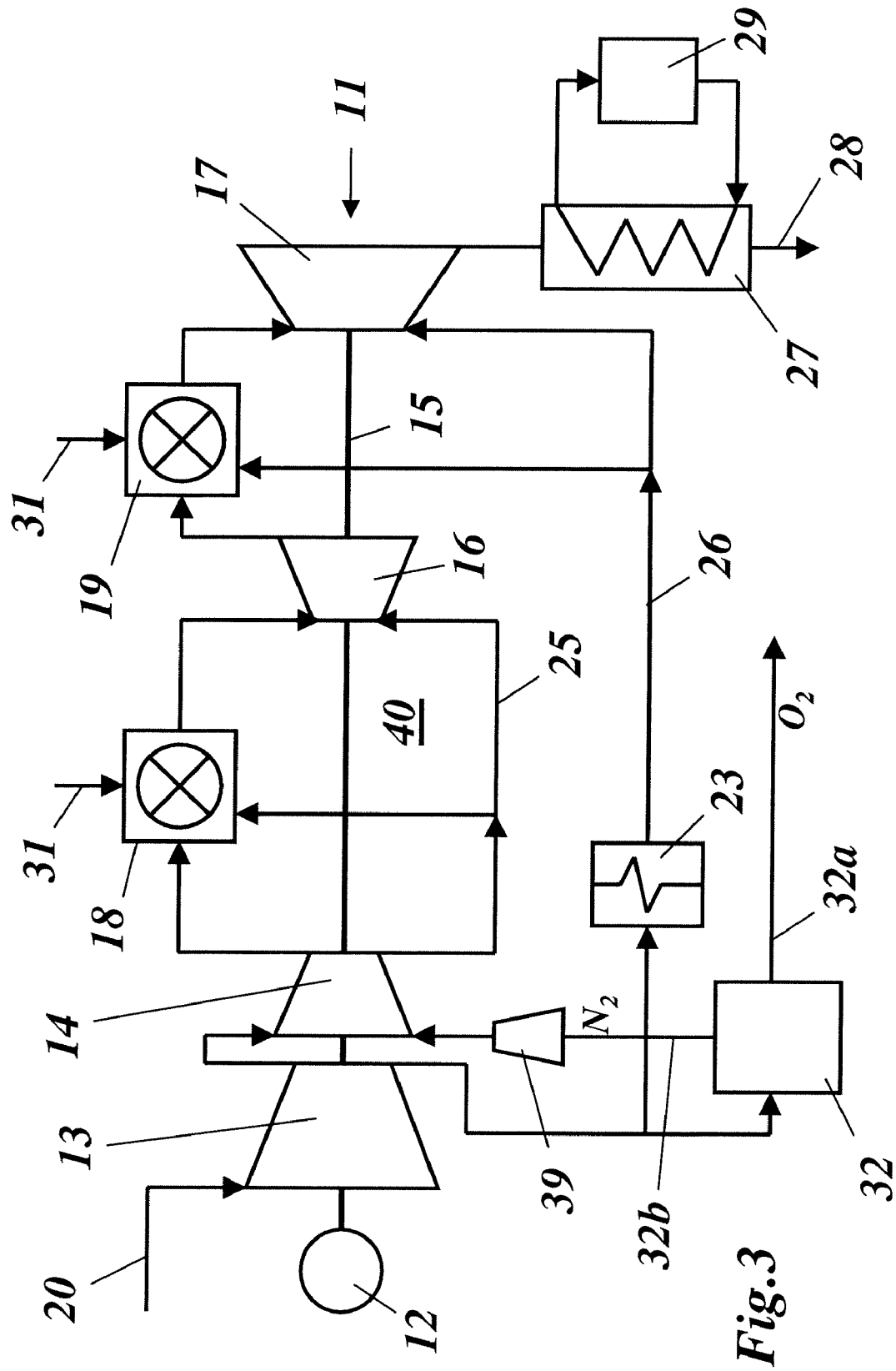
FIG. 3 shows an first embodiment example of the return of the nitrogen recovered in the separation of the air to the compressor, in a unit of the type shown in FIG. 2.
Figure 4:
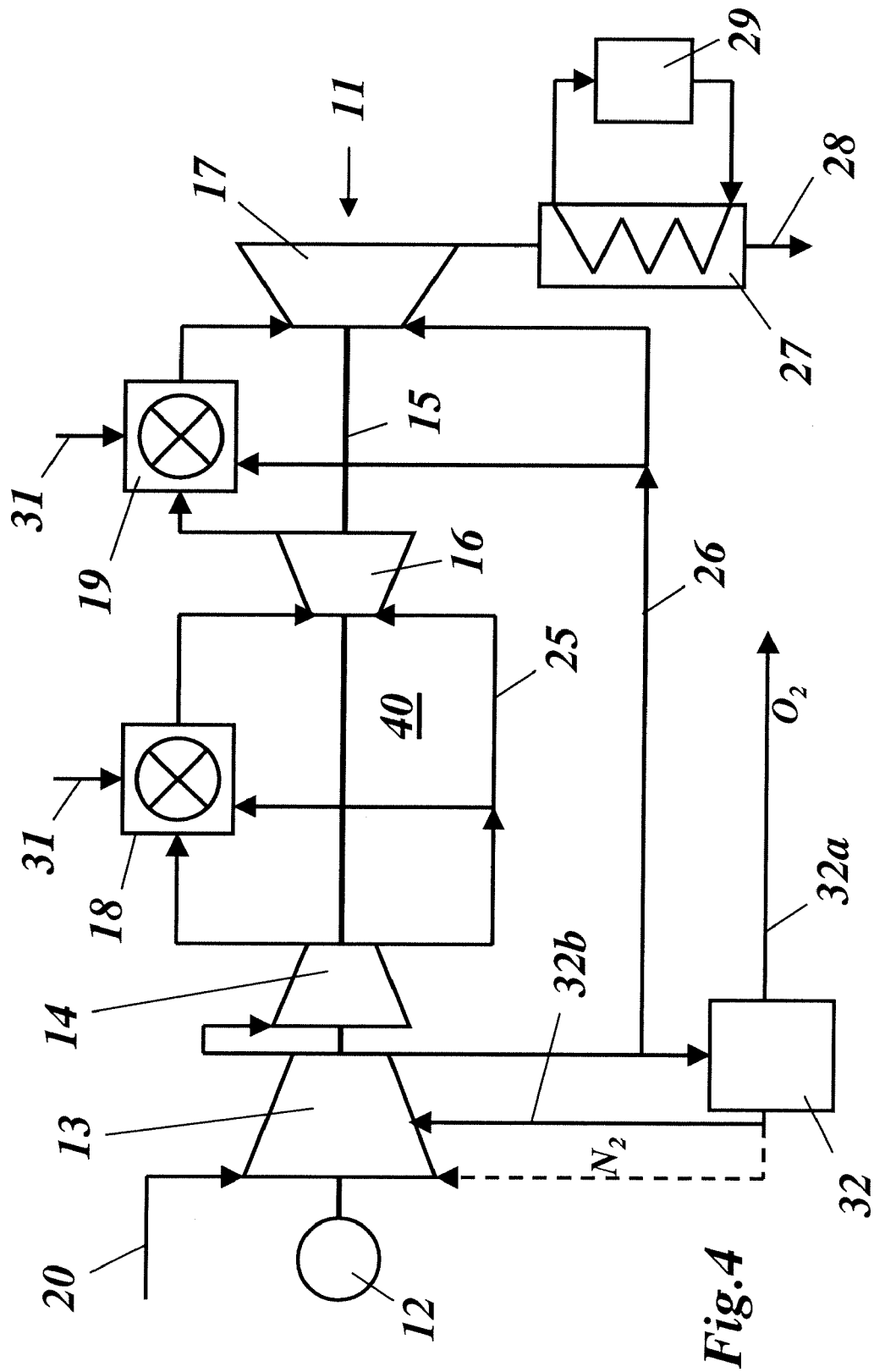
FIG. 4 shows a second embodiment example of the return of the nitrogen recovered in the separation of the air to the compressor in a unit of the type depicted in FIG. 2, according to the invention.

In such a plant configuration, according to FIG. 3 or 4, the use of the cool nitrogen that occurs in the separation of the air is now rearranged. In the combined cycle power plant 40 of FIG. 3, the reheat combustor 19 and the low pressure turbine 17 are cooled now, as in the past, by compressed air that is diverted at the outlet of the low pressure compressor 13, and then cooled down in an OTC cooler 23. The same also applies to the high pressure combustor 18 and the high pressure turbine 16, with the distinction that in the latter case, the OTC cooler 24 is no longer necessary.

According to FIG. 3, this is achieved in the following manner: the nitrogen ($N_2$) that occurs in the air separator 32 in conjunction with the separation of the air is fed into the high pressure compressor 14 via the nitrogen line 32b, and compressed there. In order to arrive at the requisite pressure level, an additional compressor 39, which compresses the nitrogen, is connected to the nitrogen line 32b. In FIG. 3, the nitrogen is input directly into the inlet of the high pressure compressor 14. It is also conceivable, however, for it to be introduced to the high pressure compressor 14 in an intermediate stage.

In the alternative configuration that is depicted in FIG. 4, the nitrogen coming out of the air separator 32 is fed into the low pressure compressor 13 via the nitrogen line 32b, either in an intermediate stage (continuous line in FIG. 4), or directly at the entrance of the low pressure compressor (line of dashes in FIG. 4). Pre-compression is not necessary in these cases.

To summarize, principles of the present invention include:
At an intermediate level of pressure (ca. 11-20 bar), air is diverted at the compressor and led to an air separation unit.
The nitrogen that occurs in the separation of the air, which exhibits a comparatively low temperature, is led back to the compressor, either
to the input of the compressor or
to an intermediate stage that is lower than the intermediate stage at which the air was diverted, or
to exactly the intermediate stage at which the air was also diverted.

In all three instances, the cool nitrogen cools the compressor air, thus representing a kind of "intermediate compressor cooling," with which all the known advantages of intermediate cooling are associated.

A prerequisite for the realization of this concept is that in both combustors of the gas turbine, undiluted coal gas (without the addition of $N_2$) can be used. Since the separation of the air provides relatively cold nitrogen, and the nitrogen is not needed for dilution in the combustor (as this is shown in FIG. 2), the nitrogen can be used very effectively for the intermediate cooling. By these means, it becomes possible (see FIG. 4) to dispense with both OTC coolers (23, 24) for the cooling of the cooling air.

LIST OF REFERENCE SIGNS 10,30,40 combined cycle power plant
11 gas turbine
12 generator
13 low pressure compressor
14 high pressure compressor
15 shaft (gas turbine)
16 high pressure turbine
17 low pressure turbine
18 high pressure combustor
19 reheat combustor
20 air inlet
21,22 fuel feedline
23,24 OTC cooler
25,26 cooling line
27 heat recovery steam generator
28 flue gas line
29 steam turbine (steam cycle)
31 syngas feed line
32 air separation unit
32a oxygen line
32b nitrogen line
33 coal feeding
34 coal gasifier
35 cooling device
36 filtering device
37 $CO_2$ separator
38 $CO_2$ outlet
39 compressor While the invention has been described in detail with reference to exemplary embodiments thereof, it will be apparent to one skilled in the art that various changes can be made, and equivalents employed, without departing from the scope of the invention.

The invention claimed is:

1. A method for the operation of a gas turbine, wherein the gas turbine comprises a first compressor for compressing drawn in air to a first stage of pressure and a second compressor for further compressing air from the first pressure stage to a second, higher pressure stage, the method comprising:
   drawing in air and compressing said air with said first and second compressors of the gas turbine;
   conducting the compressed air to a combustor;
   combusting said compressed air with a syngas in said combustor, said syngas recovered from coal, to generate hot gases;
   expanding the hot gases from the combustion in a downstream turbine as said hot gases do work;
   separating a portion of the compressed air from the first compressor into oxygen and nitrogen;
   using the oxygen in a coal gasifying plant to generate said syngas;
   cooling portions of the gas turbine that are exposed to hot gases with a portion of the compressed air;
   wherein said gas turbine comprises a reheating gas turbine including a first combustor, a second combustor, a first turbine, and a second turbine;
   wherein combusting comprises combusting said syngas in the first combustor with the compressed air;
   wherein expanding the hot gases comprises expanding in the first turbine;
   combusting syngas in the second combustor with gases from the first turbine;
   expanding hot gases from the second combustor in the second turbine; and
   conducting the nitrogen from said separating to, and compressing said nitrogen in, said gas turbine.

2. A method according to claim 1, further comprising:
   conducting said nitrogen from said separating to the second compressor.

3. A method according to claim 2, further comprising:
   compressing said nitrogen from said separating in another compressor, to generate pre-compressed nitrogen, before it is conducted to the second compressor.

4. A method according to claim 3, comprising:
   conducting said pre-compressed nitrogen to an inlet of the second compressor.

5. A method according to claim 1, further comprising:
   conducting said nitrogen from said separating back to the first compressor.

6. A method according to claim 5, wherein conducting the nitrogen comprises conducting from the first compressor to an intermediate stage.

7. A method according to claim 5, wherein conducting the nitrogen comprises conducting to an inlet of the first compressor.

* * * * *